United States Patent [19]
White

[11] 3,961,346
[45] June 1, 1976

[54] LIQUID INSPECTION SLIDE

[75] Inventor: Fred K. White, Glen Ellyn, Ill.

[73] Assignee: Miles Laboratories, Inc., Elkhart, Ind.

[22] Filed: Jan. 30, 1975

[21] Appl. No.: 545,379

[52] U.S. Cl............................ 356/244; 350/95; 356/246
[51] Int. Cl.² .................. G01N 21/16; G01N 1/10
[58] Field of Search ............ 356/244, 246; 350/92, 350/95

[56] References Cited
UNITED STATES PATENTS

| | | | |
|---|---|---|---|
| 3,705,000 | 12/1972 | Guerra | 350/96 |
| 3,777,283 | 12/1973 | Elkins | 356/246 |
| 3,814,522 | 6/1974 | Clark et al. | 350/96 |

*Primary Examiner*—Vincent P. McGraw
*Attorney, Agent, or Firm*—Louis E. Davidson

[57] ABSTRACT

Transparent organoplastic apparatus is described having at least one capillary chamber formed therein communicating with an outer edge of the apparatus. This chamber has a flat bottom wall and a flat upper wall forming the capillary chamber therebetween. The upper wall has an outer edge extending inwardly in a concave fashion from the outer edge of the apparatus, exposing the portion of the bottom wall between the outer edge of the upper wall and the outer edge of the apparatus. Liquid to be inspected is placed on this exposed portion of the bottom wall at the concave outer edge of the upper wall, and capillary action draws such liquid into the capillary chamber where it can be microscopically examined.

10 Claims, 10 Drawing Figures

LIQUID INSPECTION SLIDE

BACKGROUND AND PRIOR ART

Microscopic examination of liquid specimens, such as urine, blood, spinal fluid and cell cultures, is usually carried out by placing a small drop of the specimen on a flat transparent microscope slide and then placing a thin flat transparent coverslip over the specimen. The coverslip presses against the slide and spreads the liquid into a thin section or film in the capillary space between the coverslip and the slide. The coverslip-slide combination is then placed on a microscope stage and the thin section of specimen liquid is then microscopically examined through the transparent slide and coverslip.

The above prior art procedure has several disadvantages. First, it requires an excessive amount of manipulation to place the specimen on the slide and then place the coverslip thereon. It requires a certain amount of skill to properly position the coverslip. If an excessive amount of specimen is employed, the excess will be forced out of the capillary space between the slide and coverslip. It is difficult to remove this excess specimen without physically disturbing the position of the coverslip. The entrapment of air between the slide and the coverslip can form undesirable bubbles which interfere with the microscope examination.

Efforts have been made in the prior art to provide liquid specimen holders which overcome the above-described disadvantages of the slide-coverslip combination. Unfortunately, these prior art devices have had problems in use, primarily with formation of undesirable air bubbles in the capillary specimen chamber. Illustrative prior art devices are those shown in U.S. Pat. Nos. 3,565,537 and 3,777,283. There is now a commercial need for a liquid inspection slide that obviates the difficulties of the prior art.

SUMMARY OF THE INVENTION

In accordance with the present invention a liquid inspection apparatus is provided comprising a transparent organoplastic slide having an outer edge portion and having at least one capillary examination chamber formed therein and extending inwardly from said outer edge portion, said chamber having a flat bottom wall surface and having a flat upper wall surface formed on the underside of a thin flat upper wall portion, said upper and bottom wall surfaces extending at a slight acute angle from one another to form the capillary chamber therebetween, said upper wall portion being cut away adjacent said slide outer edge portion to define an outer edge of said upper wall portion extending inwardly in a concave fashion from the outer edge portion of said organoplastic slide.

The concave shape of the outer edge of the upper wall of the capillary chamber exposes the portion of the bottom wall of the capillary chamber between the concave outer edge of the upper wall and the outer edge of the slide. Liquid to be inspected is placed on this exposed portion of the bottom wall at the outer edge of the upper wall, and capillary action draws such liquid into the capillary chamber. Excess liquid can be conveniently removed by tilting the slide and allowing such excess to fall off. The liquid retained in the capillary chamber can then be microscopically examined through the upper wall of the capillary chamber which serves the same function as the prior art coverslip.

DESCRIPTION OF THE INVENTION

Figure 1:
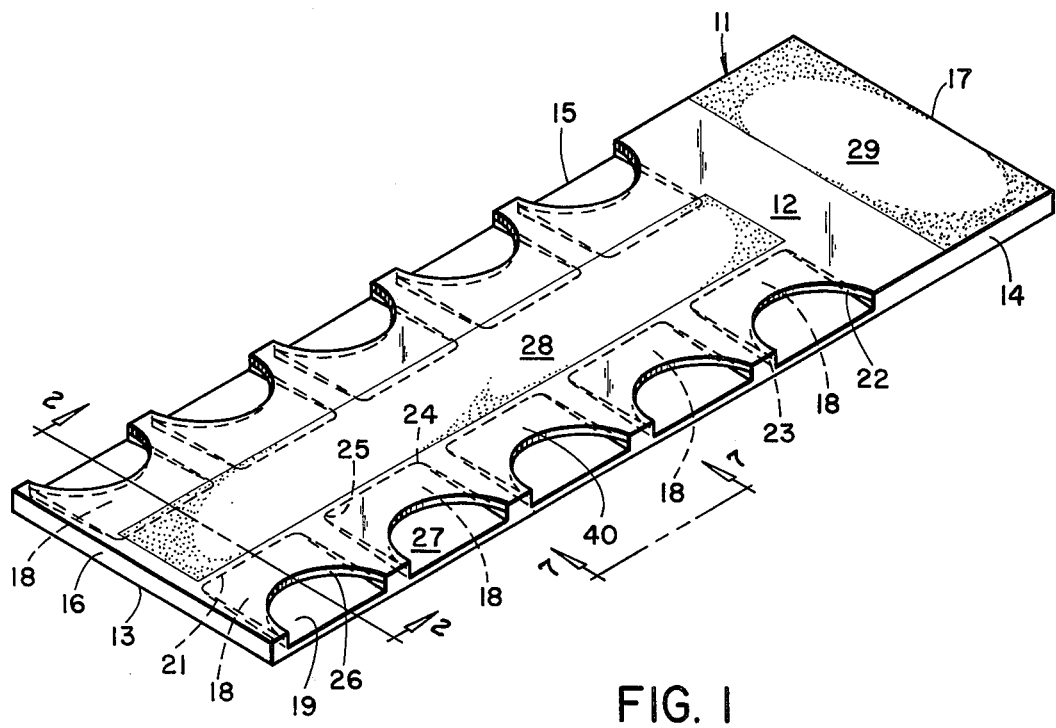
FIG. 1 is a perspective view of one embodiment of the present invention.
Figure 2:
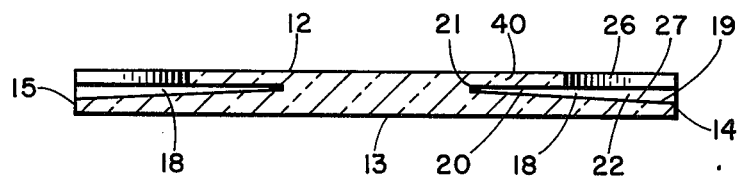
FIG. 2 is an enlarged vertical cross-sectional view of the apparatus of FIG. 1 taken along line 2—2.

Referring to FIGS. 1 and 2, the illustrated embodiment of the apparatus of the present invention comprises a slide 11 of generally rectangular shape having parallel planar top and bottom surfaces 12 and 13, parallel planar longitudinal sidewall surfaces or edges 14 and 15, and parallel planar endwall surfaces 16 and 17. A plurality of capillary chambers 18 are formed in slide 11 extending inwardly from the edges 14 and 15. As shown in FIG. 2, each chamber 18 has a flat bottom wall surface 19 and a flat upper wall surface 20 which is parallel with top surface 12 and forms therein a thin flat upper wall portion 40. The bottom wall surface 19 and the upper wall surface 20 define the upper and lower edges of a straight rear wall 21 and diverge therefrom at a slight acute angle of about 1°–4° therebetween to form the capillary chamber 18. Capillary chamber 18 is preferably generally rectangular in shape with two opposing generally planar and parallel tapered sidewalls 22 and 23 extending inwardly from the outer edge 14 and/or 15 of slide 11 and having curved inner end portions 24 and 25 which join opposite ends of the straight rear wall 21. Each wall portion 40 is cut away to define an arcuate outer edge surface 26 which extends inwardly in a concave fashion from the outer edge 14 or 15 of the slide 11 and from the outer ends of the capillary chamber sidewalls 22 and 23. With the exception of the cutaway portion aforementioned, the wall portion 40 of capillary chamber 18 extends to the outer edge 14 or 15 of the slide 11 as shown in FIG. 1. The arcuate outer edge surface 26 of wall portion 40 and the capillary chamber 18 thus both communicate directly with the outer edge 14 or 15 of slide 11. A portion 27 of each bottom wall surface 19 is thus exposed outwardly of the respective concave arcuate edge surface 26. The slide 11 can also have frosted areas 28 and 29 located on top surface 12, if desired, for application of indicia for identification purposes.

The apparatus described herein can be conveniently molded as a unitary body from suitable organoplastic materials, such as polystyrene, polyacrylate, polymethacrylate, acrylonitrile-styrene copolymers, nitrile-acrylonitrile-styrene copolymers, polyphenyleneoxide, phenoxy resins, cellulose acetate propionate, cellulose acetate butyrate and the like. Since the finished apparatus is to be used for optical microscopic examination, these materials are also desirably optically transparent. The particular material of choice will depend upon the effect it has upon the surface tension phenomena and thus the capillary action of the liquid specimens to be examined. Cellulose acetate propionate has been found suitable for urine and blood specimens.

Figure 3:
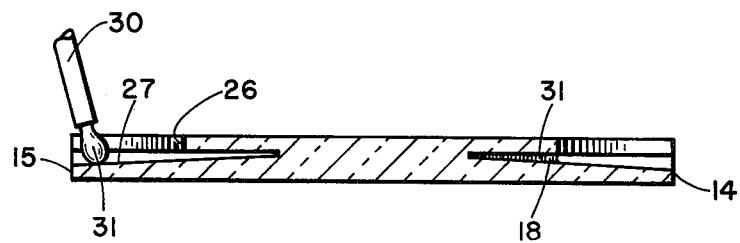
FIG. 3 is the same view as in FIG. 2 showing the apparatus in use.

In the use of the apparatus of the present invention as shown in FIG. 3, a pipette or a rod 30 or other suitable transfer device containing a liquid specimen or having a drop 31 of the liquid specimen adhered thereto is positioned adjacent to the slide 11 so that a drop 31 of the liquid specimen can be placed on the exposed portion 27 of bottom wall surface 19 near an outer end of edge surface 26 and an adjacent outer end of a tapered sidewall 22 or 23. This is shown in the left-hand portion of FIG. 3. The liquid specimen 31 is then drawn into the capillary chamber 18 along said adjacent sidewall and thence along the rear wall 21 to the opposite tapered sidewall of the chamber, thereby filling the space covered by wall portion 40. The curved inner ends 24 and 25 of the tapered chamber sidewalls 22 and 23 facilitate filling of chamber 18 with the liquid specimen by minimizing the formation of air pockets. Any excess liquid can be removed from surface 27 by tilting the slide and allowing the excess liquid to run off. The resulting liquid 31 within the capillary chamber 18 is shown in the right-hand portion of FIG. 3. The slide containing the liquid specimen can then be employed for microscopic examination in a well-known manner. The microscopic examination is conducted on the specimen contained between wall portion 40 and bottom wall surface 19.

The embodiment of the apparatus shown in FIG. 1 has 10 chambers which can allow 10 different specimens to be conveniently examined under a microscope. The apparatus of the present invention significantly reduces the overall manipulative steps required to obtain thin sections of liquid specimens. It also enables the analytical procedures to be standardized and consistent. The volumes of the capillary chambers can be controlled to any desired consistent value by proper mold design resulting in uniform quantities of liquid specimens being retained for examination purposes.

Figure 4:
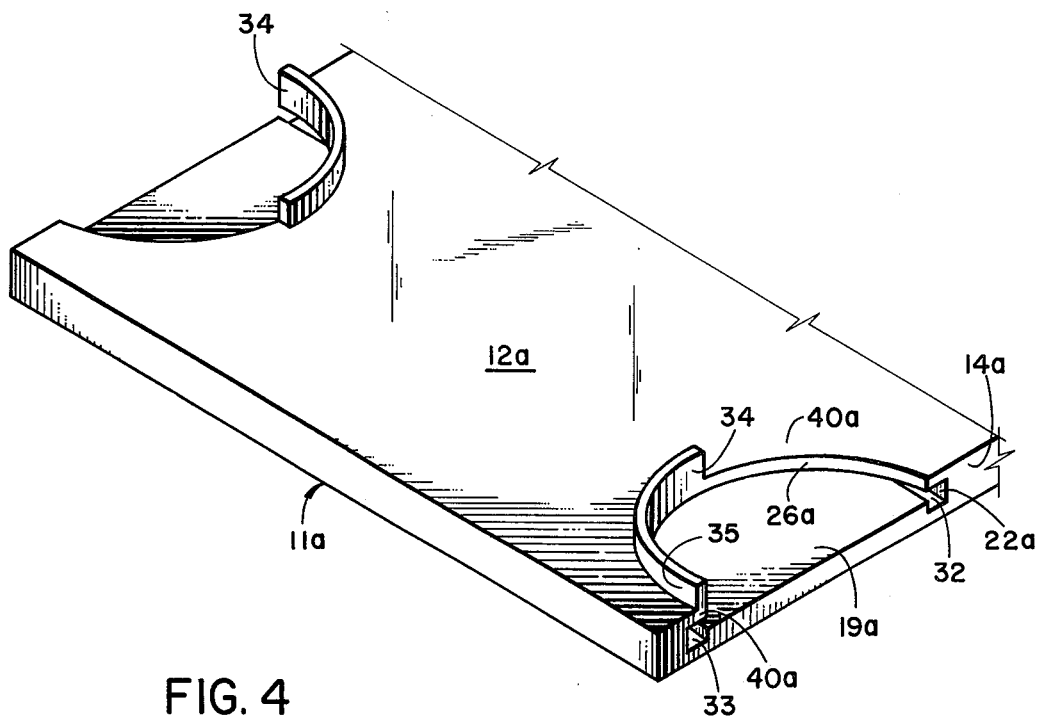
FIG. 4 is a fragmentary perspective view of another embodiment of the present invention.
Figure 6:
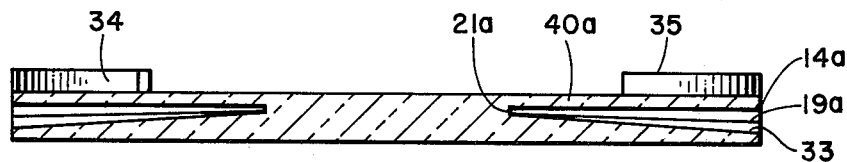
FIG. 6 is an enlarged vertical cross-sectional view of the apparatus of FIG. 5 taken along line 6—6.
Figure 5:
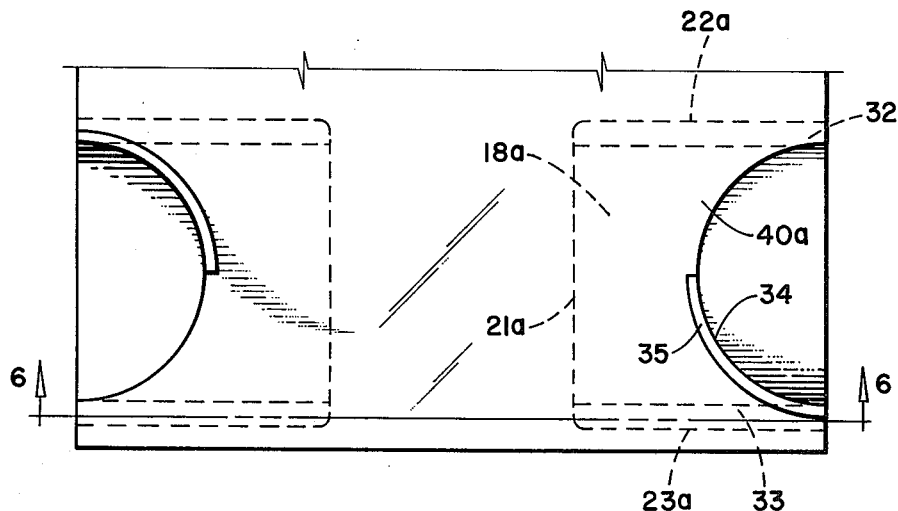
FIG. 5 is a fragmentary top plan view of the embodiment of FIG. 4.

The apparatus embodiment shown in FIGS. 4, 5 and 6 illustrates a modified form of slide structure which provides accelerated filling of the capillary chamber and also minimizes inadvertent mispositioning of a liquid specimen applied thereto. Elements in these figures which are the same as those of FIG. 1 have the same number with a suffix "a".

As best shown in FIGS. 4 and 5, the tapered sidewalls 22a and 23a are spaced outwardly from the junctures of the outer ends of the arcuate edge surface 26a with the edge surface 14a, and rectangular tapered grooves 32 and 33 are formed in bottom wall surface 19a adjacent to sidewalls 22a and 23a, respectively. These grooves are of similar configuration and extend from edge surface 14a to the rear wall 21a of capillary chamber 18a. As shown in FIG. 6, the groove 33 is tapered so as to have its maximum depth at edge surface 14a and its minimum depth at the rear wall 21a. It is preferred that the bottom of said grooves be flush with bottom wall surface 19a at rear wall 21a. As shown in FIGS. 4 and 5, the wall portion 40a extends over substantially the entire extents of grooves 32 and 33.

When a liquid specimen is placed on bottom wall surface 19a adjacent to groove 32 or 33, the respective groove channels the liquid back into the capillary chamber along the side of the capillary chamber corresponding to the location of the groove forcing air from the capillary chamber as the incoming liquid specimen flows along the rear wall and outwardly along the groove on the opposite side of the capillary chamber, ultimately filling the capillary chamber 18a by capillary action.

In order to further assist a technician to properly position liquid specimen in the use of this apparatus, a target surface 34 is provided by a vertical arcuate flange 35 extending upwardly from the upper surface 12a adjacent to and flush with the arcuate edge surface 26a, as shown in FIGS. 4, 5 and 6. Flange 35 extends inwardly in an arcuate fashion from edge surface 14a partially along arcuate edge surface 26a. A liquid specimen drop placed against target surface 34 drops onto bottom wall surface 19a and is conducted into capillary chamber 18a. The flange 35 minimizes and virtually eliminates the undesirable mispositioning of liquid specimen onto top surface 12a of the slide 11a. The target surface 34 insures application of the specimen drop to the bottom wall 19a adjacent a sidewall of the capillary chamber 18a, so that the specimen can most efficiently and quickly fill said chamber.

Figure 7:
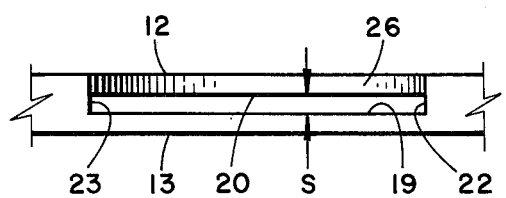
FIG. 7 is an enlarged partial side elevation view of the apparatus of FIG. 1 taken along line 7—7.
Figure 8:
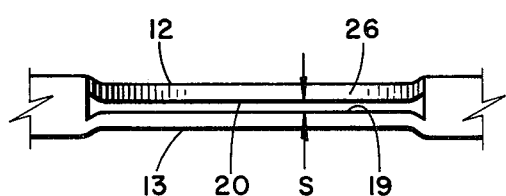
FIG. 8 is the same view as in FIG. 7 of a modified form of the apparatus.

The capillary chamber 18 of FIG. 1 can be conveniently molded with a spacing of about 0.005 to about 0.015 in. between the upper wall surface 20 and the bottom wall surface 19. This is shown as spacing "S" in FIG. 7. This spacing is satisfactory for examination of most liquid specimens. In the event that a smaller spacing "S" is desired, it is not convenient or practical to directly mold a slide having this smaller dimension. One way of achieving a smaller dimension "S" is by thermal distortion of a molded slide. Heated pressure elements (not shown) can be applied to one or both of the upper surface 12 and the lower surface 13 of slide 11 directly over and/or under the capillary chamber 18 and the wall portion of the slide contacted by each heated element is pressed inwardly a desired amount. The distortion resulting from the use of two opposing heated pressure elements is shown in FIG. 8 in which the spacing "S" is noticeably smaller than that in FIG. 7.

The apparatus embodiment shown in FIG. 1 has a plurality of capillary chambers and is primarily intended for the examination of multiple samples. It is understood that the apparatus of the present invention can have more or fewer than the ten chambers shown in FIG. 1; however, it is usually not commercially practical to initially manufacture single chambered slides.

Figure 9:
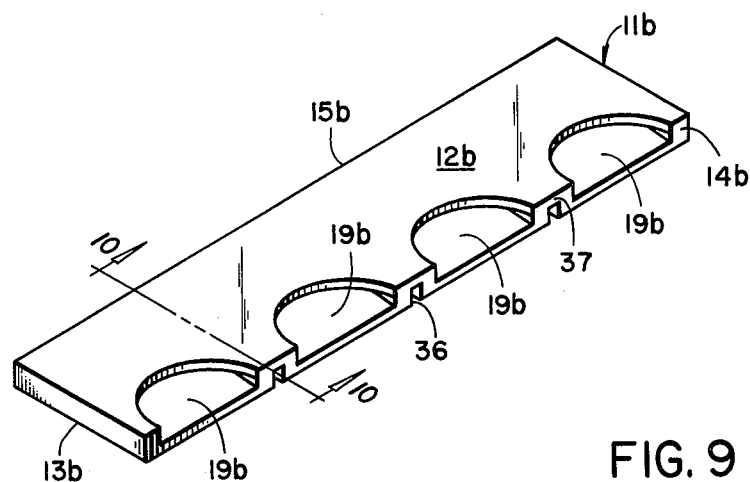
FIG. 9 is a perspective view of still another embodiment of the present invention.
Figure 10:
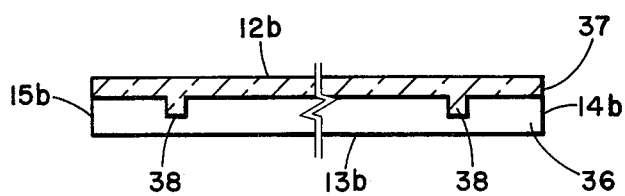
FIG. 10 is an enlarged vertical cross-sectional view of the apparatus of FIG. 9 taken along line 10—10.

If there is a reasonable demand for liquid inspection slides having only a single examination chamber, one solution to this problem is shown in FIGS. 9 and 10 in which elements common to FIG. 1 have the same numbers with a suffix "b". As shown in FIG. 9, a slide 11b has four examination chambers therein. The bottom wall surfaces of the chambers are indicated by 19b. The plate 11b, preferably on the underside 13b thereof, has a plurality of grooves 36 formed therein extending transversely thereacross from longitudinal edge 14b to corresponding edge 15b. Each groove 36 is located between adjacent examination chambers and provides a relatively thin frangible portion 37 at the base thereof which separably joins adjacent chamber segments to each other.

When it is desired to employ only a single examination chamber, the slide 11b can be flexed along a selected groove 36 until the slide is fractured along said groove to separate the desired chamber segment from the remainder of the slide. It is understood that the initial slide is capable of being frangibly separated into a plurality of individual chamber segments each having at least one capillary chamber therein.

In order to facilitate predictable fracture of the slide along the groove 36, the slide is formed in each groove with at least one integral rib member 38 which extends transversely across the base of the groove from one adjacent segment to the other. Such rib members are shown in cross-section in FIG. 10.

What is claimed is:

1. A liquid inspection apparatus comprising a transparent organoplastic slide having an outer edge portion and having at least one capillary examination chamber formed therein and extending inwardly from said outer edge portion, said chamber having a flat bottom wall surface and having a flat upper wall surface formed on the underside of a thin flat upper wall portion, said upper and bottom wall surfaces extending at a slight acute angle from one another to form the capillary chamber therebetween, said upper wall portion being cut away adjacent said slide outer edge portion to define an outer edge of said upper wall portion extending inwardly in a concave fashion from the outer edge portion of said organoplastic slide.

2. A liquid inspection apparatus according to claim 1 having a plurality of capillary examination chambers therein, each of said plurality of chambers having the same configuration as the chamber of claim 1.

3. A liquid inspection apparatus according to claim 1 wherein at least one groove is formed in the bottom wall of the capillary chamber and extends from the outer edge of the slide inwardly toward the rear of the chamber.

4. A liquid inspection apparatus according to claim 3 wherein the groove is tapered so as to have its maximum depth at the outer edge of the slide and its minimum depth at the rear of the chamber.

5. A liquid inspection apparatus according to claim 1 wherein the capillary chamber has a generally rectangular shape with two opposing planar sidewalls and a straight rear wall, the sidewalls having a slight inward curvature at the junction thereof with the rear wall.

6. A liquid inspection apparatus according to claim 5 wherein at least one groove is formed in the bottom wall of the capillary chamber adjacent a sidewall of the chamber, said at least one groove extending from the outer edge of the slide inwardly toward the rear of the chamber and being tapered so as to have its maximum depth at the outer edge of the slide and its minimum depth at the rear of the chamber.

7. A liquid inspection apparatus according to claim 6 wherein there is one of said grooves extending along the base of each of said chamber sidewalls.

8. A liquid inspection apparatus according to claim 7 wherein the upper wall of the capillary chamber extends over substantially the entire length of each groove.

9. A liquid inspection apparatus according to claim 1 wherein said apparatus is provided with means defining a target surface which extends upwardly from the concave outer edge of the upper wall of the capillary chamber.

10. A liquid inspection apparatus according to claim 2 wherein the slide is capable of being frangibly separated into a plurality of individual segments each having at least one capillary chamber therein.

* * * * *